United States Patent
Rathnam et al.

(10) Patent No.: US 6,682,228 B2
(45) Date of Patent: Jan. 27, 2004

(54) CONNECTOR HOUSING FOR FIBER-OPTIC MODULE

(75) Inventors: Lakshman Rathnam, Mountain View, CA (US); Albert T. Yuen, Los Altos, CA (US)

(73) Assignee: EMCORE Corporation, Santa Clara, CA (US)

(*) Notice: Subject to any disclaimer, the term of this patent is extended or adjusted under 35 U.S.C. 154(b) by 0 days.

(21) Appl. No.: 10/080,171

(22) Filed: Feb. 19, 2002

(65) Prior Publication Data

US 2003/0156796 A1 Aug. 21, 2003

(51) Int. Cl.[7] .................................................. G02B 6/38
(52) U.S. Cl. .............................. 385/55; 385/59; 385/71; 385/60; 385/72; 385/56
(58) Field of Search .......................... 385/53–56, 58–60, 385/70–72, 89

(56) References Cited

U.S. PATENT DOCUMENTS

| | | | |
|---|---|---|---|
| 4,840,451 A | * | 6/1989 | Sampson et al. ............. 385/89 |
| 5,499,311 A | | 3/1996 | DeCusatis |
| 5,548,675 A | | 8/1996 | Shigematsu et al. |
| 5,631,988 A | | 5/1997 | Swirhun et al. |
| 5,661,832 A | | 8/1997 | Yonemura |
| 5,675,683 A | | 10/1997 | Takahashi et al. |
| 5,719,978 A | | 2/1998 | Kakii et al. |
| 5,729,644 A | * | 3/1998 | Shiflett et al. ................ 385/59 |
| 5,845,026 A | | 12/1998 | Lee et al. |
| 5,887,095 A | | 3/1999 | Nagase et al. |
| 5,920,670 A | | 7/1999 | Lee et al. |
| 5,926,595 A | | 7/1999 | Matsui et al. |
| 6,004,042 A | | 12/1999 | Million et al. |
| 6,069,991 A | | 5/2000 | Hibbs-Brenner et al. |
| 6,102,581 A | * | 8/2000 | Deveau et al. ................ 385/56 |
| 6,142,677 A | | 11/2000 | Sato et al. |
| 6,146,024 A | | 11/2000 | Melchior |
| 6,186,670 B1 | | 2/2001 | Austin et al. |
| 6,196,730 B1 | | 3/2001 | Hammar |
| 6,217,229 B1 | | 4/2001 | Arab-Sadeghabadi et al. |
| 6,224,269 B1 | | 5/2001 | Engstrand et al. |
| 6,259,856 B1 | | 7/2001 | Shahid |
| 6,280,098 B1 | | 8/2001 | Alcock et al. |
| 6,293,711 B1 | | 9/2001 | Sasaki |
| 6,302,592 B1 | | 10/2001 | Züllig |
| 6,318,902 B1 | | 11/2001 | Igl et al. |
| 6,318,907 B1 | | 11/2001 | Schroeder et al. |
| 6,318,909 B1 | | 11/2001 | Giboney et al. |
| 6,328,479 B1 | | 12/2001 | Schofield et al. |
| 6,334,012 B1 | | 12/2001 | Yoon et al. |

* cited by examiner

Primary Examiner—Hemang Sanghavi
Assistant Examiner—Scott Knauss
(74) Attorney, Agent, or Firm—Sawyer Law Group LLP

(57) ABSTRACT

A connector housing for a connector to an optical device includes: a body with a bottom wall, a first side wall with a first lip, a second side wall with a second lip, where optical fibers may reside within the bottom, first side, and second side walls, where the first and second lips engage the optical fibers when residing within the bottom, first, and second side walls, where the first and second lips assist in preventing the optical fibers from being removed from the body; a spring coupled to the body and the optical fibers; and a sleeve coupled to the body, including a locking feature for locking the body to the optical device. The connector housing is compact in size, allowing larger numbers of fiber-optic modules to reside on a printed circuit board, increasing its density for optical devices. A connector with the connector housing is also more cost effective to manufacture.

41 Claims, 14 Drawing Sheets

FRONT PERSPECTIVE VIEW

FRONT PERSPECTIVE VIEW

PERSPECTIVE VIEW

TOP VIEW

END VIEW

SIDE VIEW

PERSPECTIVE VIEW

SIDE VIEW

TOP VIEW

SECTION G-G

END VIEW

SECTION F-F

TOP VIEW

END VIEW

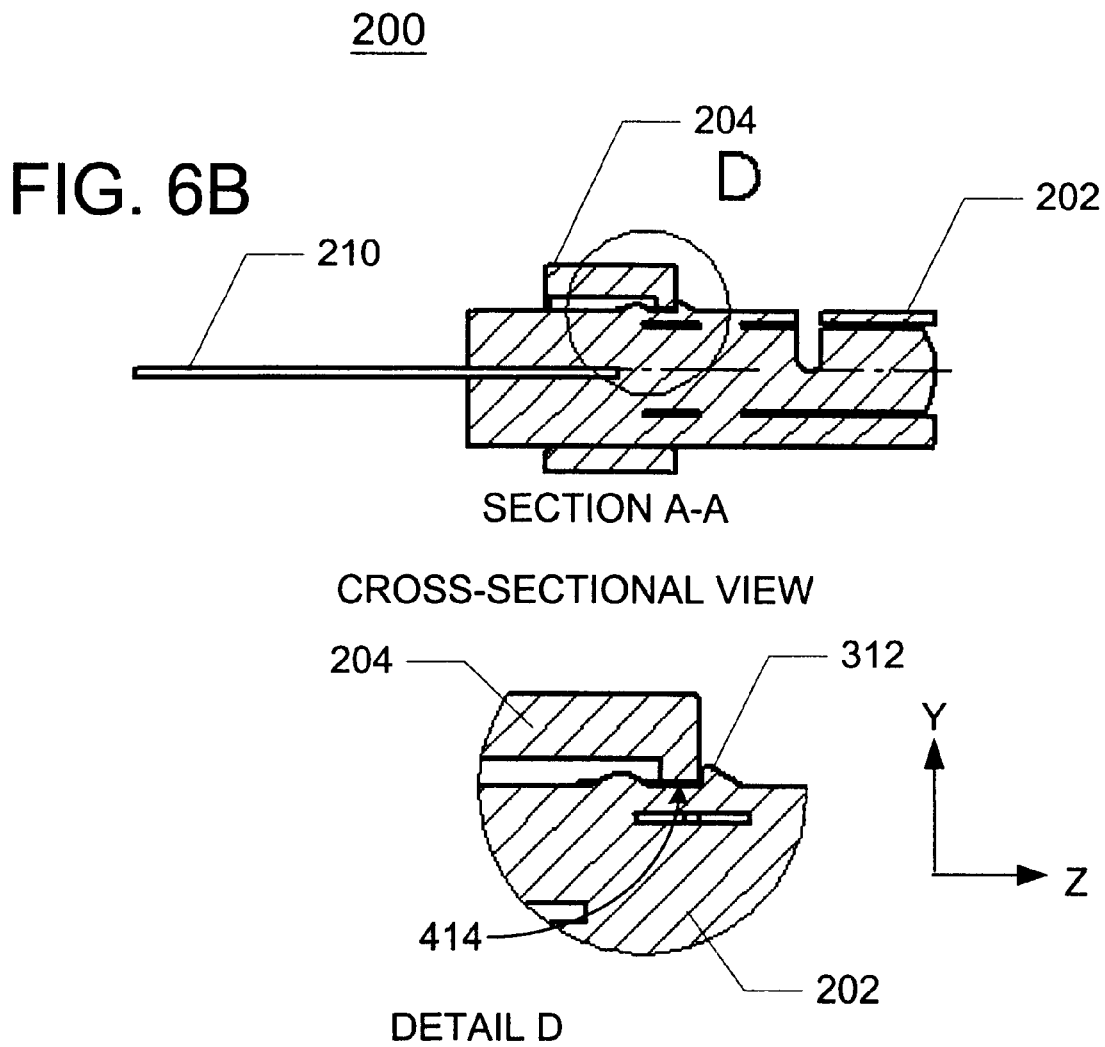

CONNECTOR HOUSING FOR FIBER-OPTIC MODULE

FIELD OF THE INVENTION

The present invention relates to fiber optic connectors, and more particularly to fiber optic connectors for fiber-optic transmitters, receivers, and transceivers, collectively referred to as fiber-optic modules.

BACKGROUND OF THE INVENTION

Fiber-optic modules for communication applications are well known in the art. Typically, a plurality of such fiber-optic modules is provided on a printed circuit board (PCB) of a network card. Connectorized optical fibers are used to optically couple these modules to each other and to other optical devices in a system. Some of the optical devices include passive components, such as, fiber cable adapters.

FIG. 1A illustrates a conventional connector mounted at an end of a single or multiple optical fibers. Strains of multiple optical fibers are referred to as fiber ribbons. The connector 100 comprises a ferrule 108 and a connector housing. The connector housing comprises a boot assembly 102 and a coupling 104. Residing within the connector housing are optical fibers contained within a fiber ribbon 106, with the bare fiber ends held in the ferrule 108. FIG. 1B illustrates in more detail the conventional connector. The boot assembly 102 of the connector 100 comprises a boot 1, a crimp ring 2, a spring push 3, a spring 4, a pin clamp 5, and a guide pin 6. The coupling 104 comprises slots 7 along its sides. During manufacturing, the pieces 1–6 of the boot assembly 102 and the coupling 104 are slipped onto the fiber ribbon 106. Next, the ferrule 108 and the bare fibers within the ferrule 108 are fabricated. The ferrule 108 and fiber ends are polished simultaneously. The boot assembly 102 and coupling 104 are assembled so that the ferrule 108 and a portion of the fiber ribbon 106 reside within the boot assembly 102 and coupling 104. The assembled connector 100 can then be plugged into a connector receptacle of a transceiver. The spring 4 facilitates a good optical interface between the ferrule 108 in the connector 100 and the connector receptacle in the fiber-optic module. The connector 100 is conventionally known as a MPO connector according to the standard IEC 61754-7, which has an MT ferrule according to the standard IEC 61754-5. Other types of optical connectors also exist in industry.

FIG. 1C illustrates a conventional connector receptacle. The receptacle may be a part of a fiber-optic module (not shown).or an adapter to mate the conventional connector to another connector. The receptacle 150 comprises an opening 152. The opening 152 comprises a plurality of fingers 154. For MPO connectors, such as connector 100, the receptacle 150 has two fingers 154. The fingers 154 are capable of flexing outward when force is applied to move them such. When the force is removed, the fingers 154 return to their original positions. When the connector 100 is inserted into the opening 152 of the receptacle 150, the fingers 154 slide within the slots 7 and engage the coupling 104.

On a PCB, the fiber-optic modules are typically arranged in an array or multiple staggered arrays, which are positioned between other components. When greater bandwidth is desired, additional PCB's with transceivers can be installed. Alternatively, the number of fiber-optic modules per circuit board can be increased by reducing the area requirement for each module and its associated connector. The latter provides desirable space and cost savings. Referring to FIG. 1A, the conventional connector 100 is 46.4 mm in length, 12.55 mm in width, and 7.6 mm in height. This size adds to the area of the fiber-optic module and connector used on the PCB and limits the number of modules that can be placed on the PCB, both in width and length. The space and cost savings and bandwidth per board are thus also limited.

Accordingly, there exists a need for an improved optical connector that allows increased density for optical devices on circuit boards. The improved optical connector should be cost effective to manufacture. The present invention addresses such a need.

SUMMARY OF THE INVENTION

A connector housing for a connector to an optical device includes: a body with a bottom wall, a first side wall with a first lip, a second side wall with a second lip, where optical fibers may reside within the bottom, first side, and second side walls, where the first and second lips engage the optical fibers when residing within the bottom, first, and second side walls, where the first and second lips assist in preventing the optical fibers from being removed from the body; a spring coupled to the body and the optical fibers; and a sleeve coupled to the body, including a locking feature for locking the body to the optical device. The connector housing is compact in size, allowing larger numbers of transceivers to reside on a printed circuit board, increasing its density for optical devices. A connector with the connector housing is also more cost effective to manufacture.

BRIEF DESCRIPTION OF THE FIGURES

FIG. 6B illustrates a cross sectional view of the connector sleeve engaging the ridges in the connection in accordance with the present invention. FIG. 6C illustrates an enlarged view of area D of FIG. 6B.

DETAILED DESCRIPTION

The present invention provides an improved optical connector that allows increased density for optical devices on circuit boards. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The connector in accordance with the present invention comprises a connector housing coupled to a ferrule and fiber ribbon. The connector housing comprises features that allow the connector to couple to a receptacle comprising a fiber-optic module or another optical device. The connector housing is compact in size, allowing larger numbers of fiber-optic modules to reside on a printed circuit board, increasing its density for modules and other optical devices. The connector in accordance with the present invention is also more cost effective to manufacture.

To more particularly describe the features of the present invention, please refer to FIGS. 2A through 6C in conjunction with the discussion below.

Figure 1A:
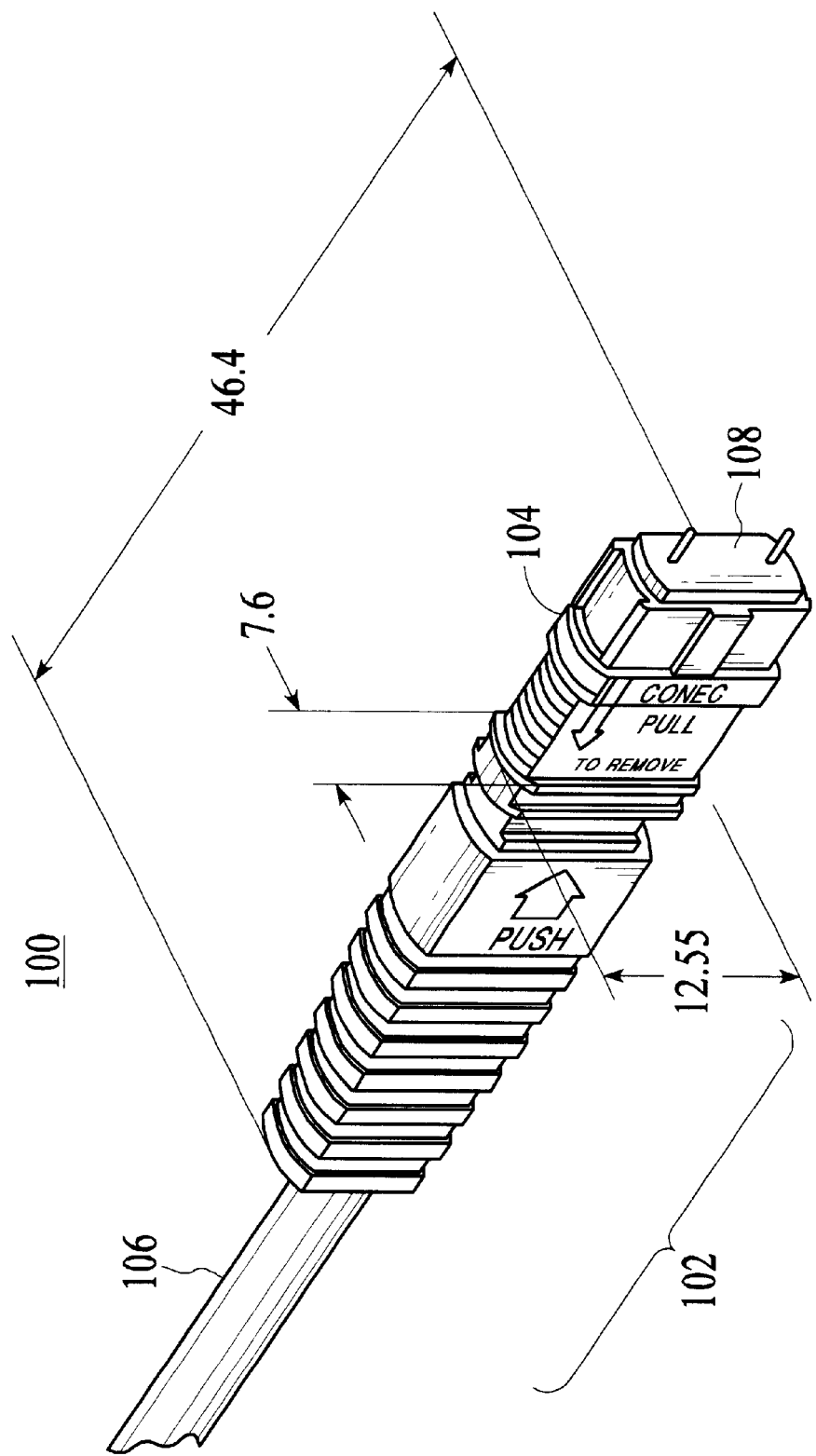
FIG. 1A illustrates a conventional connector mounted at an end of a single or multiple optical fibers.
Figure 1B:
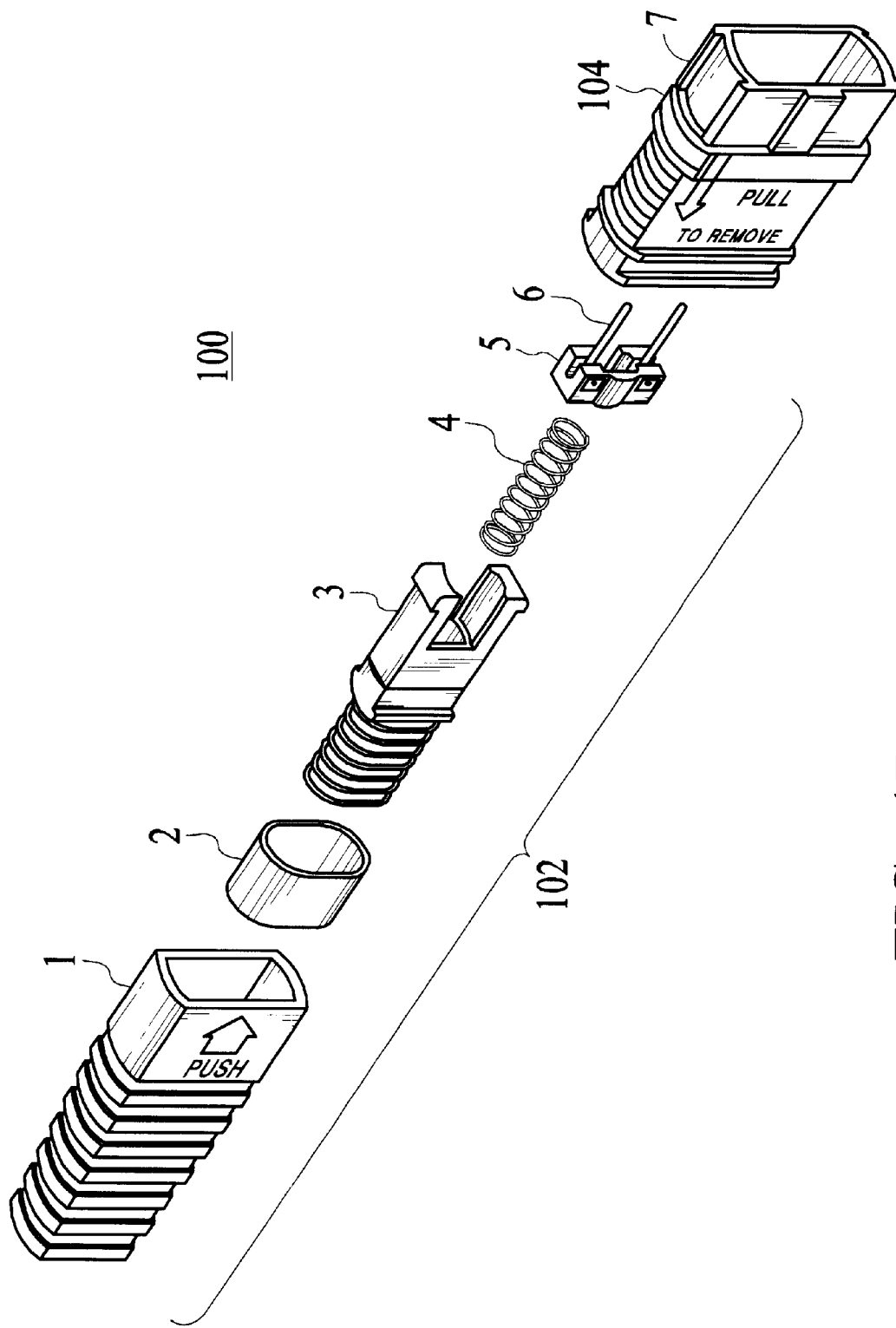
FIG. 1B illustrates in more detail the conventional connector.
Figure 2A:
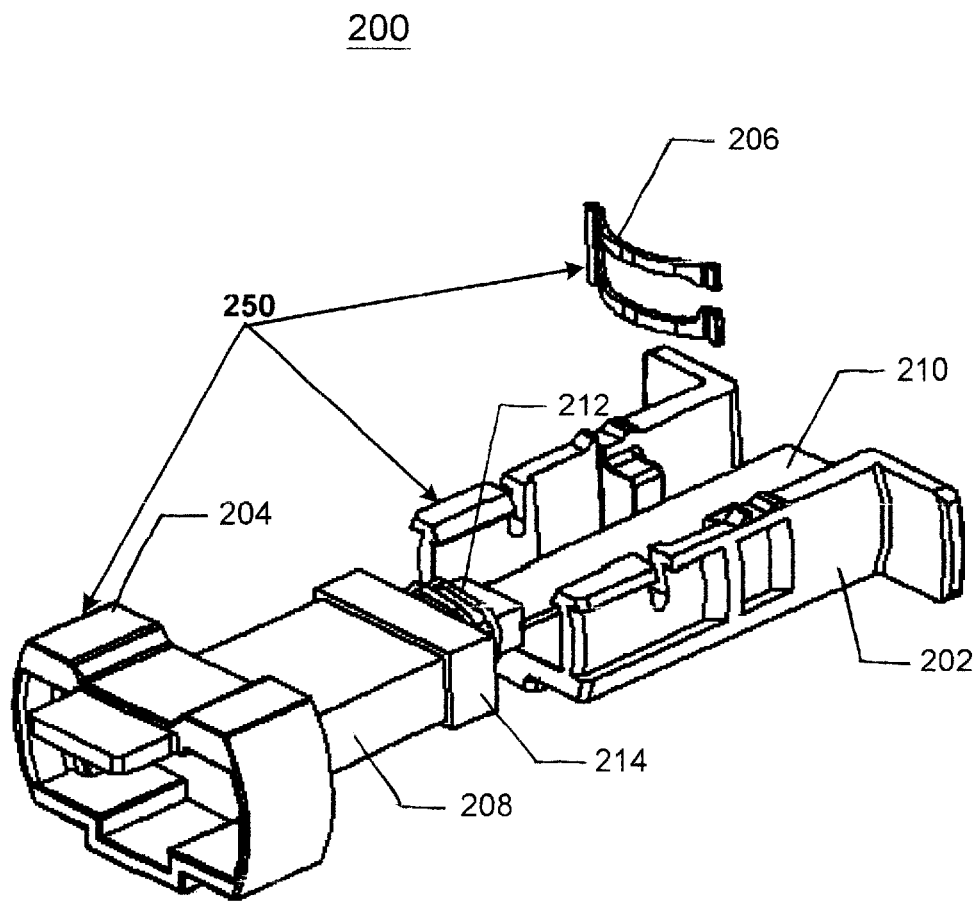
FIGS. 2A and 2B illustrate a front perspective view and back perspective view, respectively, of a preferred embodiment of a connector in accordance with the present invention.
Figure 2A:
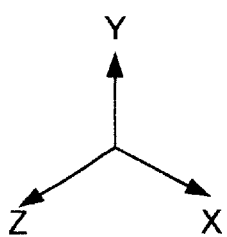
Figure 2B:
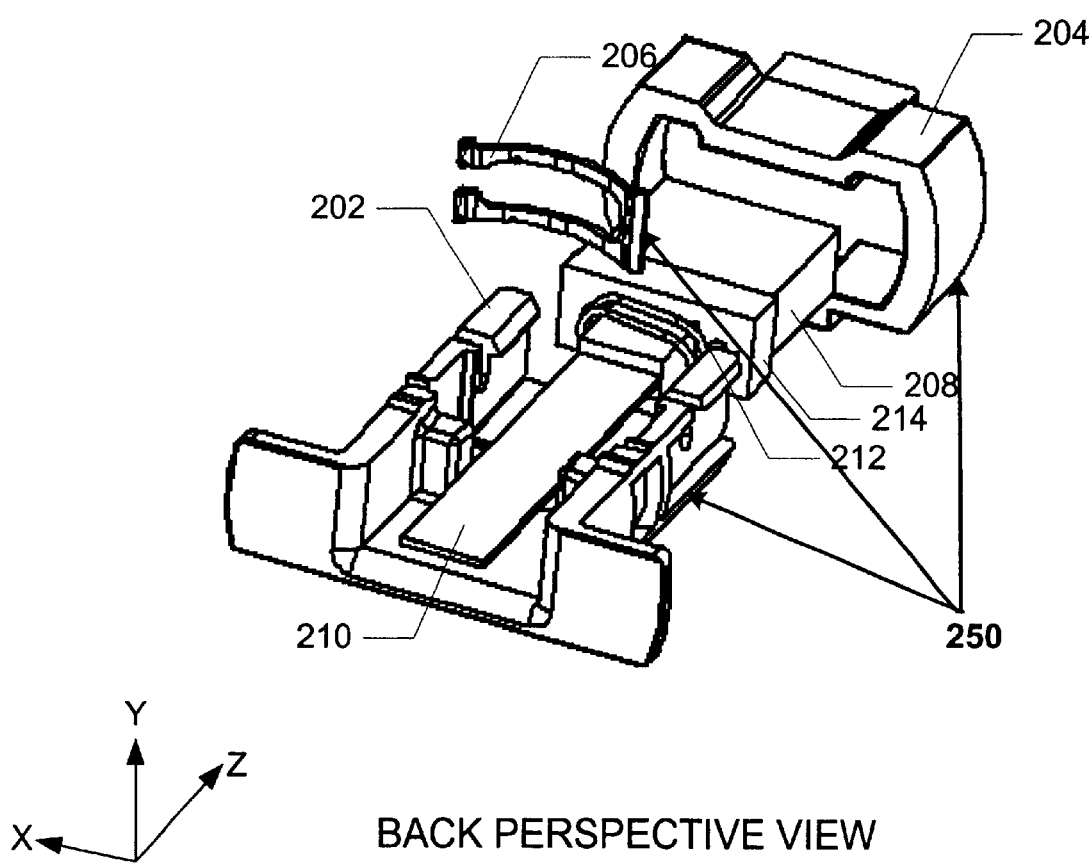
Figure 3A:
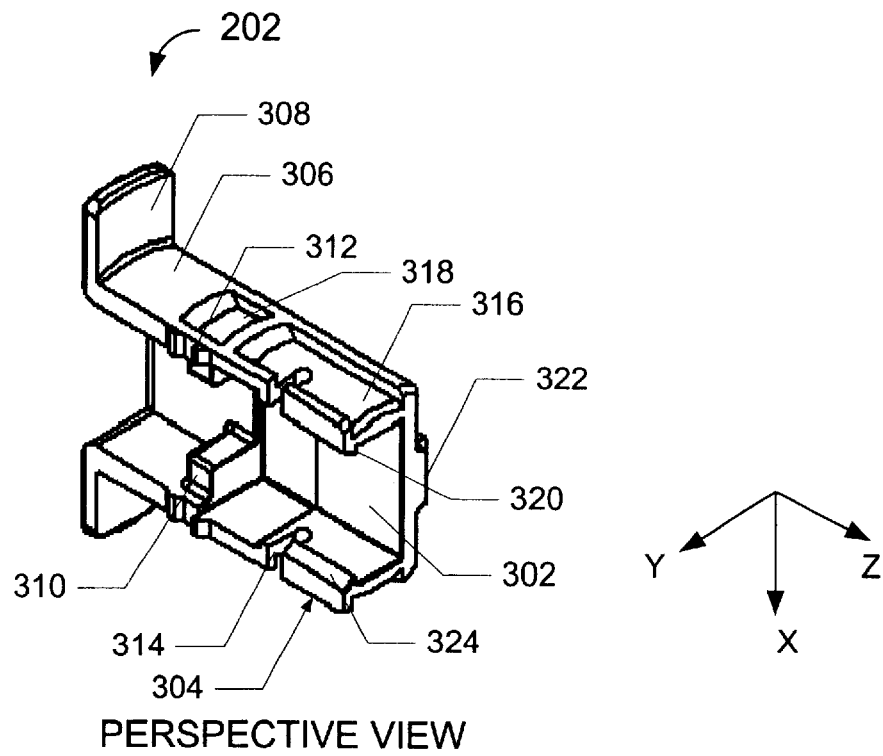
FIGS. 3A–3D illustrate perspective, top, end, and side views, respectively, of the connector body of the preferred embodiment of the connector in accordance with the present invention.
Figure 3B:
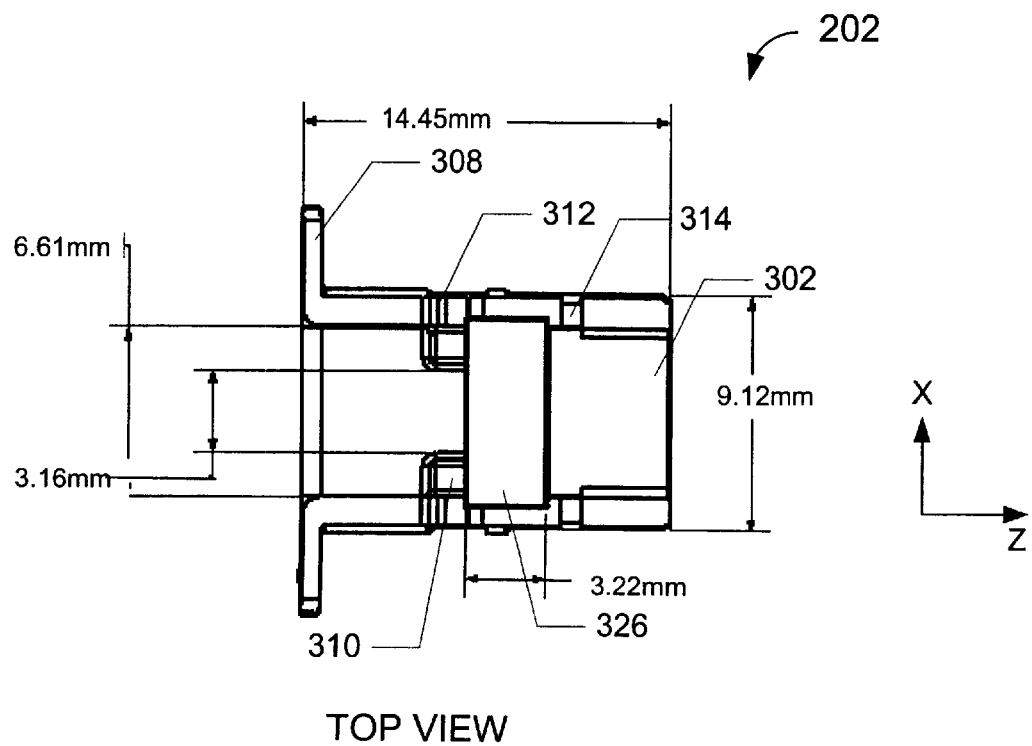
Figure 3C:
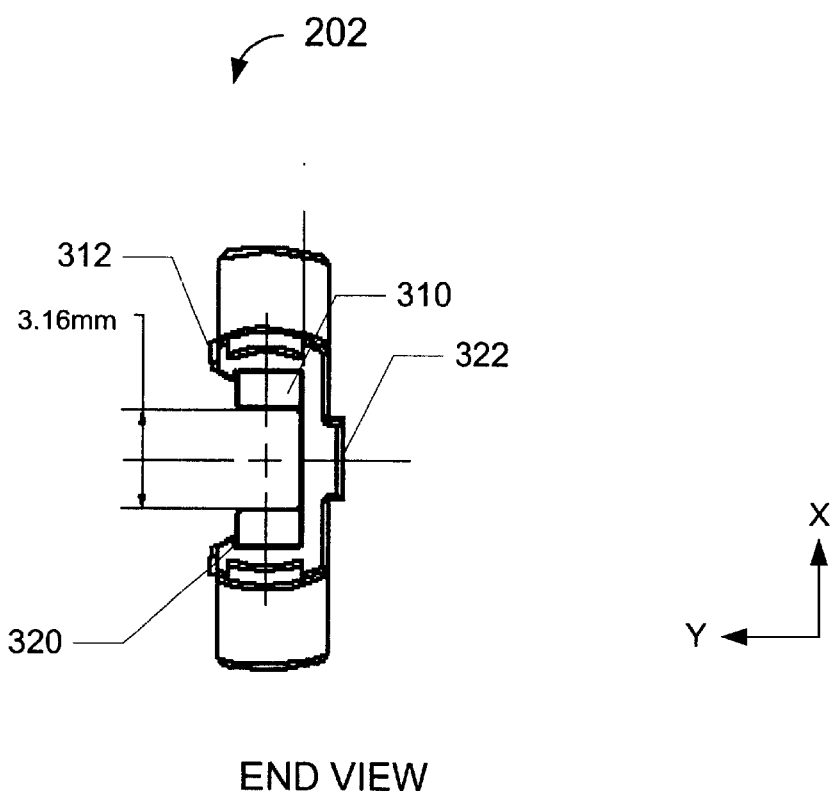
Figure 3D:
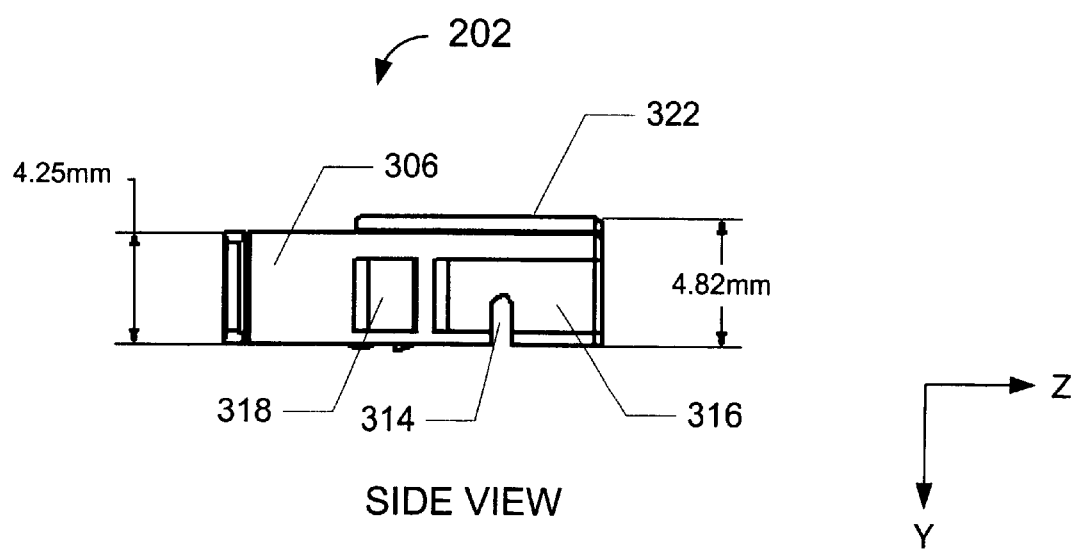

FIGS. 2A and 2B illustrate a front perspective view and back perspective view, respectively, of a preferred embodiment of a connector in accordance with the present invention. The connector 200 comprises a connector housing 250, a ferrule 208, and a fiber ribbon 210. The connector housing 250 comprises a body 202, a sleeve 204, and a spring 206. The ferrule 208 can be a conventional ferrule, such as the MT ferrule. The connector housing 250 thus can perform the same function as the connector housing of the MPO connector illustrated in FIGS. 1A and 1B. The ferrule 208 comprises a flange 214, which is the largest part of the ferrule 208. The ferrule 208 and a portion of the fiber ribbon 210 reside within the body 202. The spring 206 engages the ferrule 208 so that when the connector 200 is plugged into a receptacle of a transceiver, a good optical interface is provided between the ferrule 208 and the transceiver. The sleeve 204 slides onto the body 202 and comprises features that engage the receptacle 150. Alternatively to the spring 206 with the slit, one or more coil springs 212 can be used instead.

In the preferred embodiment, the body 202 and the sleeve 204 are composed of molded plastic, and the spring 206 or 212 is composed of sheet metal. However, other materials may be used without departing from the spirit and scope of the present invention. Although the spring 206 or 212 is illustrated as a part separate from the body 202 of the connector housing 250, its features may be molded as part of the body 202 without departing from the spirit and scope of the present invention.

FIGS. 3A–3D illustrate perspective, top, end, and side views, respectively, of the connector body of the preferred embodiment of the connector in accordance with the present invention. The body 202 comprises a bottom wall 302 and two side walls 304 and 306 coupled to one face of the bottom wall 302. Coupled to one end of the side walls 304 and 306 are tabs 308, which facilitate easy insertion and removal with the fingers. Each of the side walls 304 and 306 comprise a pair of ridges 312, a notch 314, a slot 316, and an indention 318, as illustrated. The body 202 also comprises protrusions 310 coupled to each side wall 304 and 306 and the bottom wall 302, where the protrusions 310 extend toward each other. At an end of the side walls 304 and 306 opposite to the tabs 308, the side walls 304 and 306 each comprise lips 320 and slanted faces 324. Also coupled to the bottom wall 302 at a face opposite to the side walls 304 and 306, is a slab 322. The functions of the protrusions 310, ridges 312, notches 314, slots 316, indentions 318, lips 320, slab 322, and slanted faces 324 will be described below with FIGS. 5A–5C. The body 202 also comprises an area 326 for holding the flange 214 of the ferrule 208.

In the preferred embodiment, the length of the bottom wall 302 along the z-axis is 14.45 mm. (FIG. 3B) The width of the bottom wall 302 along the x-axis is 9.12 mm. The distance between the side walls 304 and 306 is 6.61 mm. The distance between the two protrusions 310 is 3.16 mm. The length of the area 326 is 3.22 mm. The heights of the side walls 304 and 306 along the y-axis are 4.25 mm. (FIG. 3D) The height of the body 202 along the y-axis, including the slab 322, is 4.82 mm. A connector body with other dimensions is possible without departing from the spirit and scope of the present invention.

FIGS. 4A–4D illustrate perspective, side, top, and end views, respectively, of the connector sleeve of the preferred embodiment of the connector in accordance with the present invention. The sleeve 204 comprises a top wall 402, a bottom wall 404, and two side walls 406 and 408 coupled to the top 402 and bottom 404 walls. The sleeve 204 comprises a tab 410 coupled to the top wall 402 that protrudes away from the sleeve 204. The sleeve 204 also comprises an indention 412 in the bottom wall 404. The functions of the tab 410 and indention 412 will be described below with FIGS. 5A–5C.

Figure 4A:
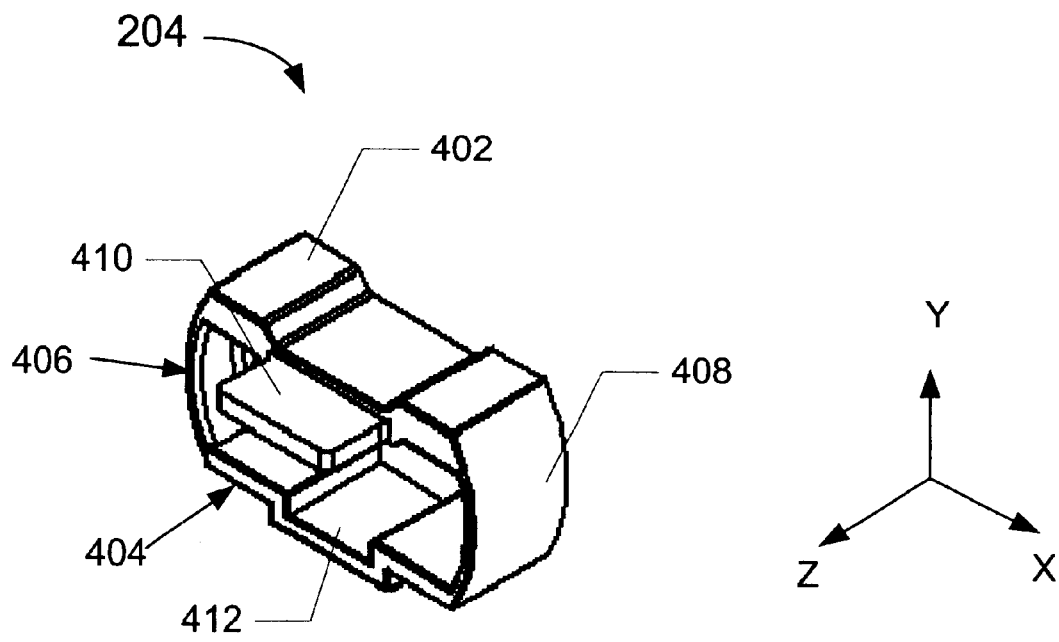
FIGS. 4A–4D illustrate perspective, side, top, and end views, respectively, of the connector sleeve of the preferred embodiment of the connector in accordance with the present invention.
Figure 4B:
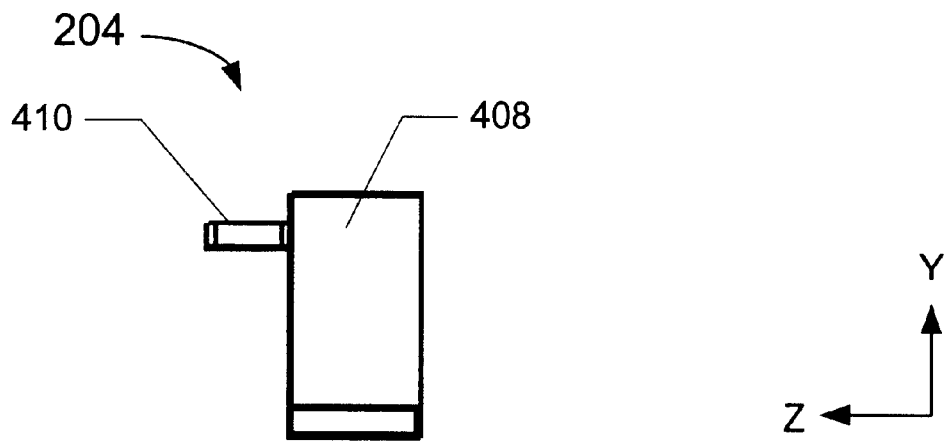
Figure 4C:
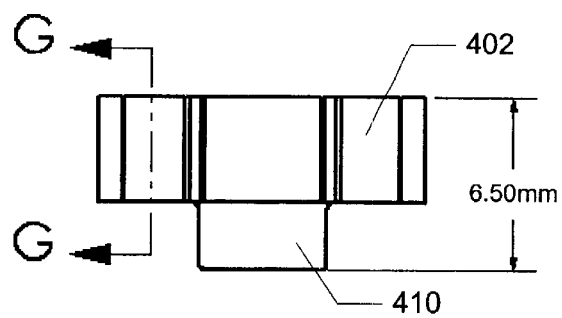
Figure 4E:
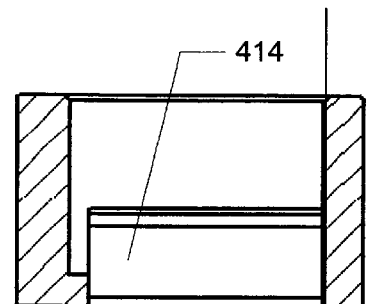
FIGS. 4E–4F illustrate a first and a second cross sectional view, respectively, of the connector sleeve of the preferred embodiment of the connector in accordance with the present invention.
Figure 4D:
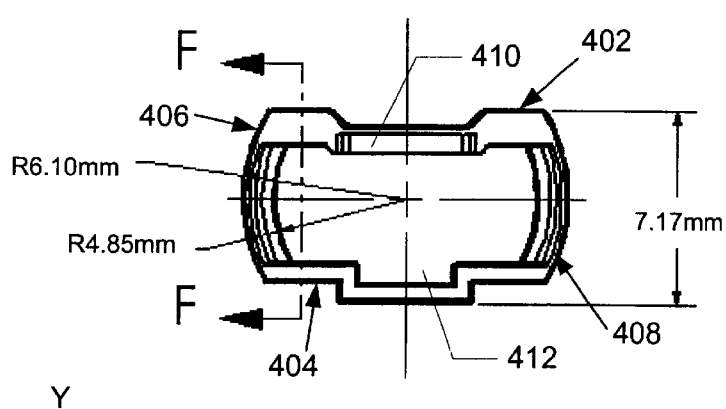
Figure 4F:
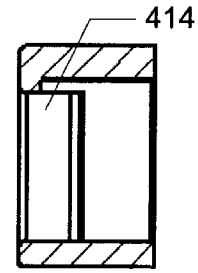

FIGS. 4E–4F illustrate a first and a second cross sectional view, respectively, of the connector sleeve of the preferred embodiment of the connector in accordance with the present invention. The first cross sectional view in FIG. 4E corresponds to the G—G cross section of the sleeve 204, as labeled in FIG. 4C. The second cross sectional view in FIG. 4F corresponds to the F—F cross-section of the sleeve 204, as labeled in FIG. 4D. As illustrated, the sleeve 204 comprises tabs 414 which protrude inward. The functions of the tabs 414 will be described below with FIG. 6B.

In the preferred embodiment, the inner radius of the sleeve 204 in the x-y plane is 4.85 mm, and the outer radius of the sleeve 204 along the x-y plane is 6.10 mm. The height of the sleeve 204 along the y-axis is 7.17 mm. A connector sleeve 204 with other dimensions is A possible without departing from the spirit and scope of the present invention.

Figure 5A:
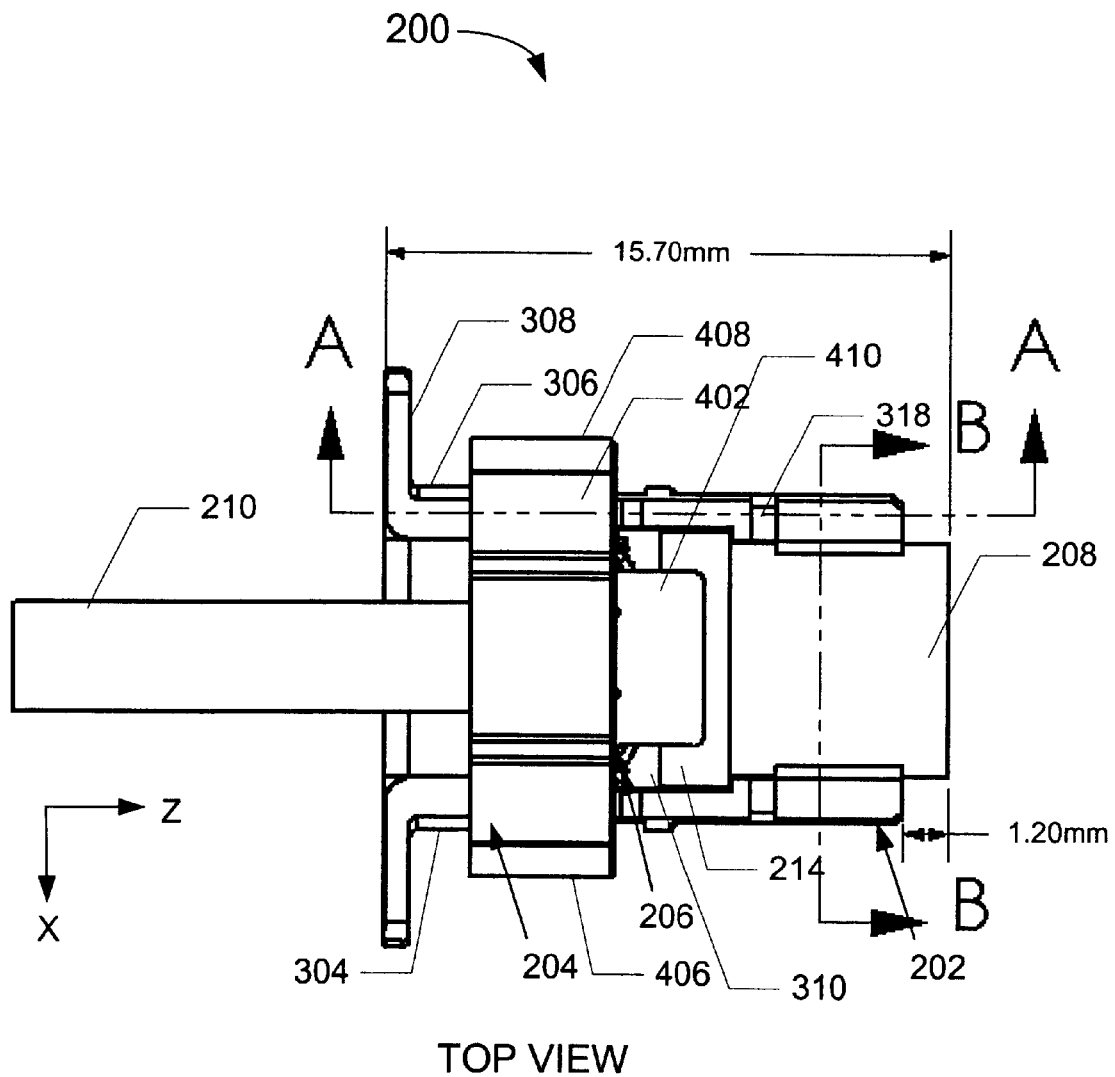
FIGS. 5A–5C illustrate top, side, and end views, respectively, of details of the preferred embodiment of the connector in accordance with the present invention.
Figure 5B:
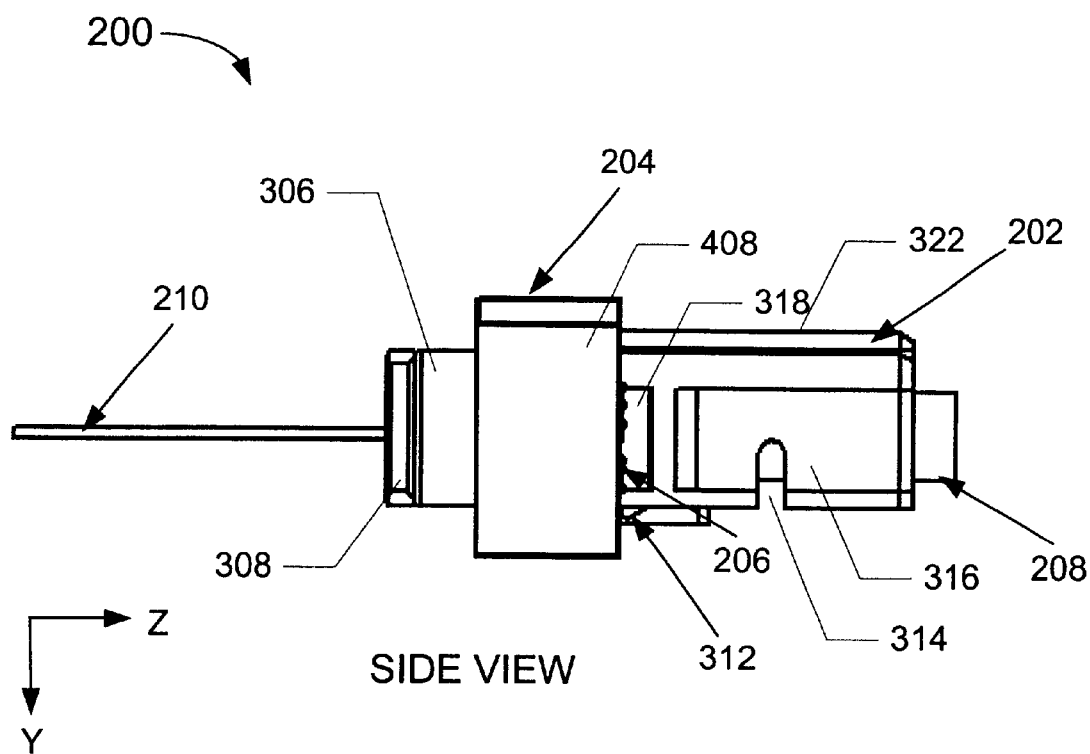
Figures 5C, 5D:
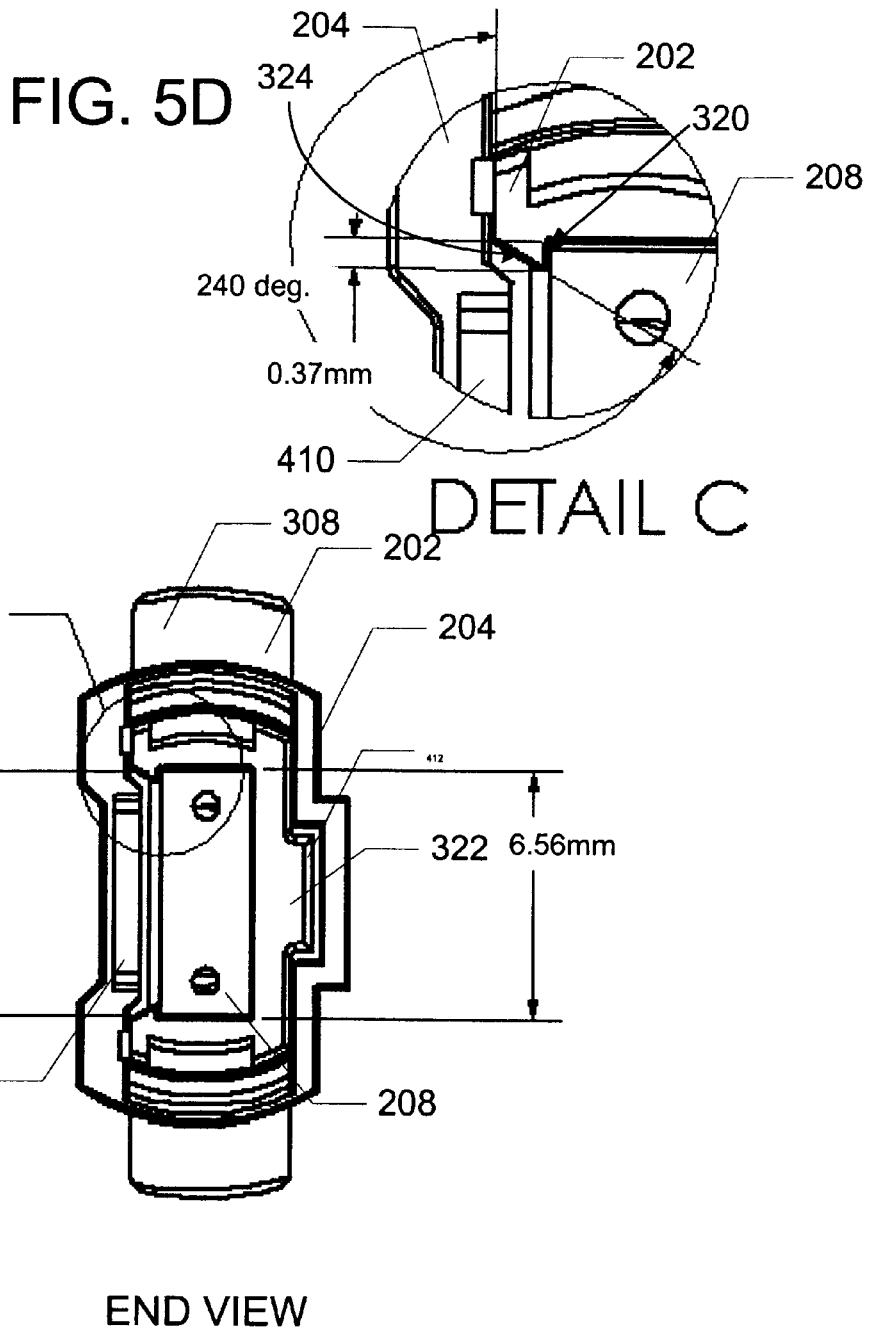
FIG. 5D illustrates a detailed end view of the ferrule as it resides with the body of the connector in accordance with the present invention.

FIGS. 5A–5C illustrate top, side, and end views, respectively, of details of the preferred embodiment of the connector in accordance with the present invention. To assemble the connector 200, a polished ferrule 208 with the fiber ribbon 210 is first fabricated. The spring 206 is then inserted onto the back side of the flange 214 of the ferrule 208. In the preferred embodiment, the spring 206 comprises a slit. The spring 206 is inserted such that the ferrule 208 resides within the slit.

The spring 206 and ferrule 208 with the fiber ribbon 210 are then placed within the body 202, such that the ferrule 208 abuts the bottom wall 302, the side walls 304 and 306, and the protrusions 310. The flange 214 of the ferrule 208 resides within the area 326 of the body 202. The spring 206 resides within the notches 314 (see FIG. 3A) in the side walls 304 and 306. The notches 314 assist in holding the spring 206 in place. As described above with FIGS. 2A and 2B, one or more coil springs 212 can alternatively be used instead of the spring 206. The coil springs 212 would not need to reside within the notches 314.

Figure 6A:
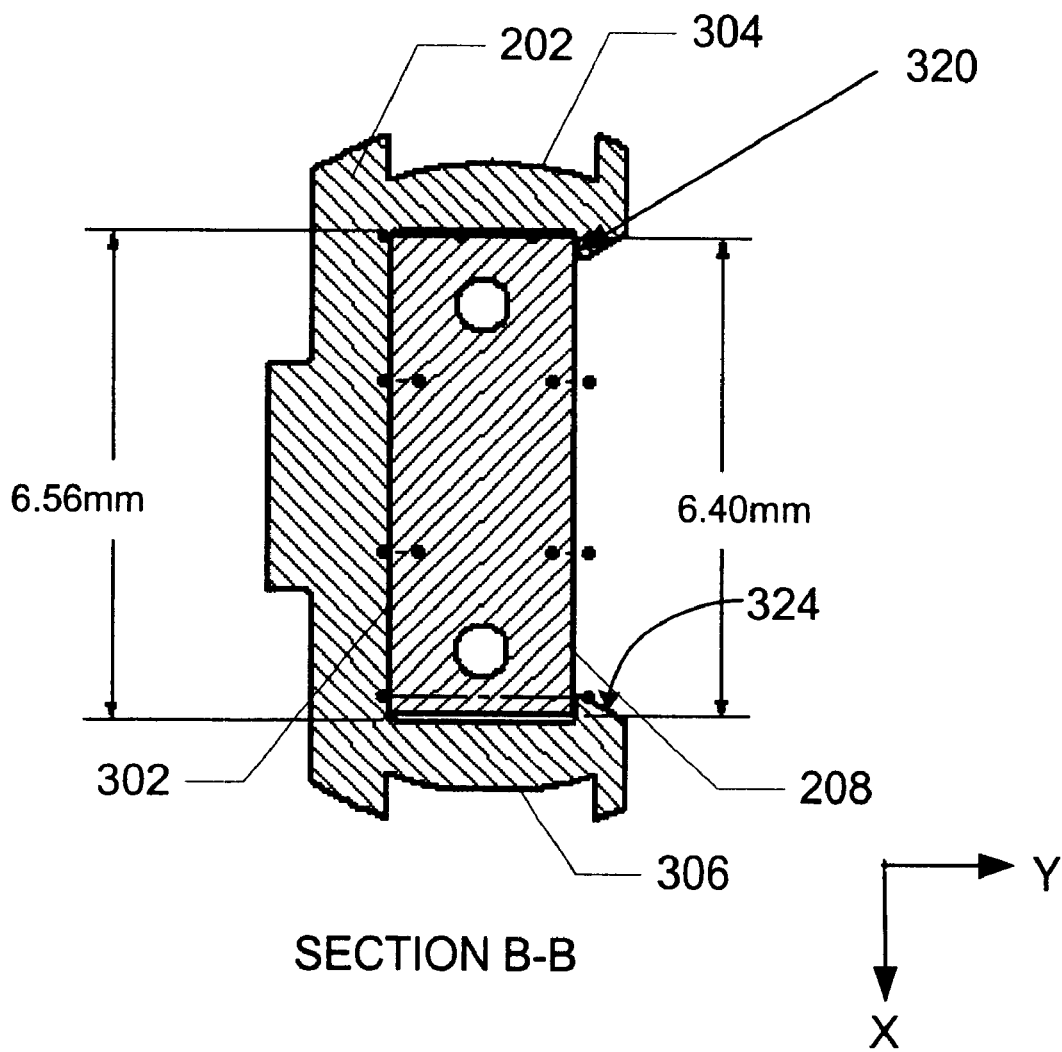
FIG. 6A illustrates a cross-sectional view of the ferrule as it resides with the body of the connector in accordance with the present invention.

In the preferred embodiment, the ferrule 208 is inserted by pushing it into the body 202 along the y-axis. As the ferrule 208 is pushed, the side walls 304 and 306 are pushed outward, away from each other, due to the pressure applied to the slanted surfaces 324 on the body 202. Once the ferrule 208 clears the slanted surfaces 324 and is fully inserted, the side walls 304 and 306 return to their original position. FIG. 5D illustrates a detailed end view of the ferrule 208 as it resides with the body 202. FIG. 6A illustrates a cross-sectional view of the ferrule 208 as it resides with the body 202. The cross sectional view corresponds to the B—B cross section labeled in FIG. 5A. When the ferrule 208 clears the slanted surfaces 324, the lips 320 of the body 202 engage the ferrule 208, preventing the ferrule 208 from falling out of the body 202. In the preferred embodiment, approximately 1.20 mm of the ferrule 208 protrudes from the edge of the body 202, as illustrated in FIG. 5A. The lengths of the slanted surfaces 324 are approximately 0.37 mm each.

Once the spring 206 and the ferrule 208 with the fiber ribbon 210 are placed within the body 202, the sleeve 204 is slipped onto the body 202. The sleeve 204 is pushed onto the body 202 with the side walls 406 and 408 of the sleeve 204 proximate to the side walls 304 and 306, respectively, of the body 202. The slab 322 of the body 202 resides within the indention 412 of the sleeve 204. FIG. 6B illustrates a cross sectional view of the connector sleeve 204 engaging the ridges 312. The cross sectional view illustrated in the top figure corresponds to the A—A cross-section as labeled on FIG. 5A. FIG. 6C illustrates an enlarged view of area D of FIG. 6B. The sleeve 204 is pushed onto the body 202 until the internally protruding tabs 414 (see FIGS. 4E–4F) engage the pair of ridges 312, such that the tabs 414 reside between the ridges 312. This is the "unlocked" position of the sleeve 204.

Figure 1C:
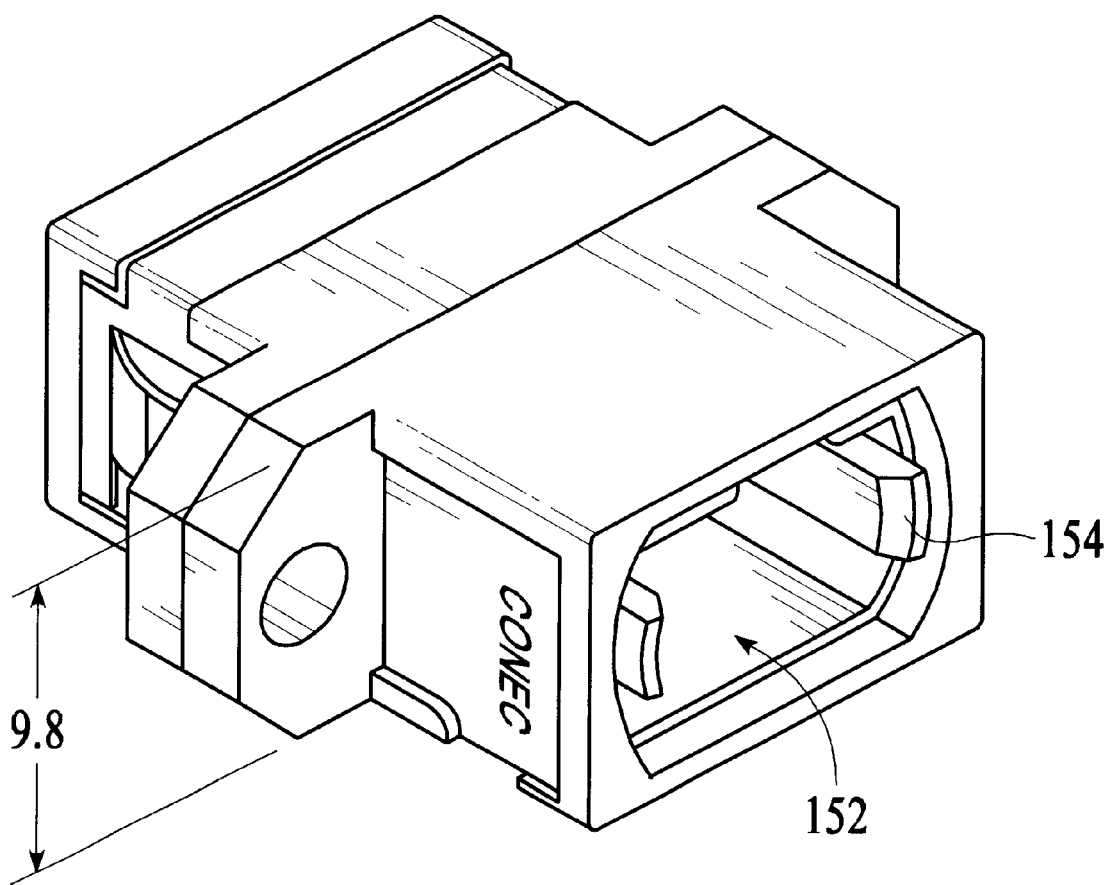
FIG. 1C illustrates a conventional connector receptacle.

The assembled connector 200 can then be coupled to a fiber-optic module. For example, the connector 200 can be inserted into the opening 152 of the conventional receptacle 150 (FIG. 1C). As the connector 200 is inserted; the fingers 154 of the receptacle 150 are pushed outward. The fingers 154 travel along the slots 316 on the side walls 306 and 308 of the body 202. The ends of the fingers 154 eventually enter the indentions 318 of the body 202, engaging the fingers 154 with the connector 200. The sleeve 204 is then pushed toward the receptacle 150 so that the tabs 414 of the sleeve 204 clear both ridges 312 on the body 202. This is the "locked" position of the sleeve 204. When in the locked position, the sleeve 204 effectively locks the fingers 154 within the indentions 318 so that the fingers 154 cannot flex outward. This prevents the connector 200 from disengaging from the receptacle 150 under normal use. The tab 410 of the sleeve 204 protects the spring 206 and ferrule 208, and limits the amount of dust that enters the connector 200. (See FIG. 5A.) The tab 410 is an optional feature of the connector 200.

To disengage the connector 200 from the receptacle 150, the sleeve 204 is pushed away from the receptacle 150 until its tabs 414 are again between the ridges 312 of the body 202, as illustrated in FIGS. 6B and 6C. This allows the fingers 154 to flex outward. The fingers 154 can then be pushed away from the body 202, and the connector 200 can be removed from the receptacle 150.

In contrast to the conventional connector 100 (FIGS. 1A–1B), the connector 200 in accordance with the present invention can be assembled without requiring the connector housing 250 to be slipped onto the fiber ribbon 210 prior to fabrication and polishing of the ferrule 208. The ferrule 208 can be fabricated and polished prior to assembly of the connector 200. This significantly increases the ease in manufacturing the connector 200, lowering the cost. Polished ferrules may be purchased from a third party, allowing a manufacturer to make only the connector housing 250, possibly further reducing the cost of manufacturing the connector 200.

The connector housing 250 is also field-removable at some time after assembly. This allows the connector housing 250 to be replaced due to damage or for an upgrade without requiring the purchase of an entirely new ferrule. The connector housing 250 can be changed for connection with different types of fiber-optic modules with different receptacle features, including custom fiber-optic modules. The connector housing can also be changed to connect different types of ferrules with fiber-optic modules. As illustrated by the example dimensions of the connector housing 250 provided above, the connector housing 250 in accordance with the present invention provides a significantly more compact connector than conventional connectors. This allows the density of fiber-optic modules on a printed circuit board and the bandwidth per board to be increased.

Although shown as a singular connector, the connector in accordance with the present invention can be provided in multiples in any configuration without departing from the spirit and scope of the present invention. For example, an array of connectors can be coupled to an array of fiber-optic modules, increasing the ease of connecting and disconnecting the connectors and fiber-optic modules.

Although the preferred embodiment of the connector is described above for use with fiber-optic modules that have MPO receptacles, the connectors can also be used either with other types of receptacles and/or other types of optical devices without departing from the spirit and scope of the present invention. For example, connector housings for MPX®, MD, MT, MTP®, and MT-RJ connectors can be manufactured.

Although the preferred embodiment of the connector is described above with a connector housing that comprises a sleeve, the connector may be used without the sleeve, if the locking function provided by the sleeve is not necessary or not desirable, without departing from the spirit and scope of the present invention.

An improved optical connector that allows increased density for optical devices on circuit boards has been disclosed. The connector in accordance with the present invention comprises a connector housing coupled to a ferrule and fiber ribbon. The connector housing comprises features that allow the connector to couple to an receptacle of a fiber-optic module or another optical device. The connector housing is compact in size, allowing larger numbers of fiber-optic modules to reside on a printed circuit board, increasing its density for optical devices. The connector in accordance with the present invention is also more cost effective to manufacture.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A connector housing for a connector to an optical device, comprising:
   a body, comprising:
      a bottom wall,
      a first side wall coupled to the bottom wall, comprising a first lip,
      a second side wall coupled to the bottom wall, comprising a second lip,
      wherein a plurality of optical fibers may reside within the bottom, first side, and second side walls,
      wherein the first and second lips engage the plurality of optical fibers when the plurality of optical fibers reside within the bottom, first, and second side walls,
      wherein the first and second lips assist in preventing the plurality of optical fibers from being removed from the body;
   a spring coupled to the body and the plurality of optical fibers; and
   a sleeve coupled to the body, comprising a locking feature for locking the body to the optical device.

2. The connector housing of claim 1, wherein the body further comprises:
   a first protrusion coupled to the first side wall and the bottom wall; and
   a second protrusion coupled to the second side wall and the bottom wall, wherein the plurality of optical fibers may abut against the first and second protrusions.

3. The connector housing of claim 1, wherein the body further comprises:
   a first slot on the first side wall, wherein a first finger of the optical device is capable of sliding along the first slot;
   a second slot on the second side wall, wherein a second finger of the optical device is capable of sliding along the second slot;
   a first indention on the first side wall, wherein the first finger is capable of residing within the first indention; and
   a second indention on the second side wall, wherein the second finger of the optical device is capable of residing within the second indention.

4. The connector housing of claim 1, wherein the first side wall comprises a first slanted surface proximate to the first lip, wherein the second side wall comprises a second slanted surface proximate to the second lip, wherein the first and second slanted surfaces facilitate a placement of the plurality of optical fibers within the bottom, first side, and second side walls.

5. The connector housing of claim 1, wherein the body further comprises:
   a first notch in the first side wall; and
   a second notch in the second side wall, wherein the spring resides within the first and second notches.

6. The connector housing of claim 1, wherein the body further comprises:
   a first and a second ridge on the first side wall, wherein a tab of the sleeve resides between the first and second ridges when the sleeve is in an unlocked position; and
   a third and a fourth ridge on the second side wall, wherein the tab of the sleeve resides between the third and fourth ridges when the sleeve is in the unlocked position.

7. The connector housing of claim 1, wherein the body further comprises:
   a first tab coupled to the first side wall at an end distal to the first lip; and
   a second tab coupled to the second side wall at an end distal to the second lip.

8. The connector housing of claim 1, wherein the body further comprises:
   a slab coupled to the bottom wall.

9. The connector housing of claim 1, wherein the plurality of optical fibers resides within a fiber ribbon and a ferrule, wherein the ferrule comprises a flange.

10. The connector housing of claim 9, wherein the body further comprises:
    an area, wherein the flange resides within the area.

11. The connector housing of claim 1, wherein the body is composed of plastic.

12. The connector housing of claim 1, wherein the spring comprises a slit, wherein the plurality of optical fibers is capable of residing within the slit.

13. The connector housing of claim 1, wherein the spring comprises at least one coil spring.

14. The connector housing of claim 1, wherein the spring is composed of metal.

15. The connector housing of claim 1, wherein the sleeve further comprises:
    a top wall;
    a bottom wall;
    a first side wall coupled to the top and bottom walls; and
    a second side wall coupled to the top and bottom walls.

16. The connector housing of claim 15, wherein the locking feature comprises:
    a first tab coupled to the top wall of the sleeve, wherein the first tab resides between a first and a second ridge on the first side wall of the body when the sleeve is in an unlocked position, wherein the first tab resides between a third and a fourth ridge on the second side wall of the body when the sleeve is in the unlocked position, wherein the first tab resides next to but not between the first, second, third, and fourth ridges when the sleeve is in a locked position.

17. The connector housing of claim 15, wherein the sleeve further comprises:
    a second tab coupled to the top wall, wherein the second tab protrudes away from the sleeve.

18. The connector housing of claim 15, wherein the sleeve further comprises:
    an indention in the bottom wall of the sleeve, wherein a slab of the body resides within the indention of the sleeve.

19. A connector housing for a connector to an optical device, the optical device including a first finger and a second finger, comprising:
    a body, comprising:
       a bottom wall,
       a first side wall coupled to the bottom wall, comprising:
          a first indention, wherein the first finger is capable of residing within the first indention, and
          a first and a second ridge, and
       a second side wall coupled to the bottom wall, comprising:
          a second indention, wherein the second finger is capable of residing within the second indention, and
          third and a fourth ridge;
    a spring coupled to the body; and
    a sleeve, comprising a locking feature for locking the first and second fingers to the body, wherein the locking feature comprises a first tab, wherein the first tab resides between the first and second ridges when the sleeve is in an unlocked position, wherein the first tab resides between the third and fourth ridge when the sleeve is in the unlocked position, wherein the first tap resides next to but not between the first, second, third, and fourth ridges when the sleeve is in a locked position.

20. The connector housing of claim 19, wherein the body further comprises:
   a first protrusion coupled to the first side wall and the bottom wall; and
   a second protrusion coupled to the second side wall and the bottom wall, wherein the plurality of optical fibers may abut against the first and second protrusions.

21. The connector housing of claim 19, wherein the body further comprises:
   a first slot on the first side wall, wherein the first finger is capable of sliding along the first slot; and
   a second slot on the second side wall, wherein the second finger is capable of sliding along the second slot.

22. The connector housing of claim 19, wherein the first side wall further comprises a first lip and the second side wall further comprises a second lip, wherein the first and second lips are capable of engaging a plurality of optical fibers residing within the bottom, first, and second side walls, wherein the first and second lips assist in preventing the plurality of optical fibers from being removed from the body.

23. The connector housing of claim 22, wherein the first side wall further comprises a first slanted surface proximate to the first lip, wherein the second side wall comprises a second slanted surface proximate to the second lip, wherein the first and second slanted surfaces facilitate a placement of the plurality of optical fibers within the bottom, first side, and second side walls.

24. The connector housing of claim 22, wherein the plurality of optical fibers resides within a fiber ribbon and a ferrule, wherein the ferrule comprises a flange.

25. The connector housing of claim 24, wherein the body further comprises:
   an area, wherein the flange resides within the area.

26. The connector housing of claim 22, wherein the body further comprises:
   a first tab coupled to the first side wall at an end distal to the first lip; and
   a second tab coupled to the second side wall at an end distal to the second lip.

27. The connector housing of claim 19, wherein the body further comprises:
   a first notch in the first side wall; and
   a second notch in the second side wall, wherein the spring resides within the first and second notches.

28. The connector housing of claim 19, wherein the body further comprises:
   a slab coupled to the bottom wall.

29. The connector housing of claim 19, wherein the body is composed of plastic.

30. The connector housing of claim 19, wherein the spring comprises a slit, wherein the plurality of optical fibers is capable of residing within the slit.

31. The connector housing of claim 19, wherein the spring comprises at least one coil spring.

32. The connector housing of claim 19, wherein the spring is composed of metal.

33. The connector housing of claim 19, wherein the sleeve further comprises:
   a top wall, wherein the tab is coupled to the top wall;
   a bottom wall;
   a first side wall coupled to the top and bottom walls; and
   a second side wall coupled to the top and bottom walls.

34. The connector housing of claim 33, wherein the sleeve further comprises:
   a second tab coupled to the top wall, wherein the second tab protrudes away from the sleeve.

35. The connector housing of claim 33, wherein the sleeve further comprises:
   an indention in the bottom wall of the sleeve, wherein a slab of the body resides within the indention of the sleeve.

36. A connector to an optical device, comprising:
   a ferrule with an optical fiber ribbon; and
   a connector housing coupled to the ferrule, the connector housing comprising:
      a body, comprising:
         a bottom wall,
         a first side wall coupled to the bottom wall, comprising a first lip,
         a second side wall coupled to the bottom wall, comprising a second lip,
         wherein the ferrule resides within the bottom, first side, and second side walls,
         wherein the first and second lips engage the ferrule, wherein the first and second lips assist in preventing the ferrule from being removed from the body,
      a spring coupled to the body and the ferrule, and
      a sleeve coupled to the body, comprising a locking feature for locking the body to the optical device.

37. A system, comprising:
   an optical device, comprising a first finger and a second finger;
   a ferrule with an optical fiber ribbon; and
   a connector housing coupled to the ferrule and the optical device, the connector housing comprising:
      a body, comprising:
         a bottom wall,
         a first side wall coupled to the bottom wall, comprising:
            a first lip,
            a first indention, wherein the first finger resides within the first indention, and
         a second side wall coupled to the bottom wall, comprising:
            a second lip, wherein the ferrule resides within the bottom, first side, and second side walls, wherein the first and second lips engage the ferrule, wherein the first and second lips assist in preventing the ferrule from being removed from the body, and
            a second indention, wherein the second finger of the optical device resides within the second indention,
      a spring coupled to the body and the ferrule, and
      a sleeve coupled to the body, comprising a locking feature for locking the first and second fingers within the first and second indentions.

38. An array of connectors, comprising:
   a plurality of ferrules with a plurality of optical fiber ribbons; and
   a plurality of connector housings coupled to the plurality of ferrules, wherein each connector housing comprises:

a body, comprising:
  a bottom wall,
  a first side wall coupled to the bottom wall, comprising a first lip,
  a second side wall coupled to the bottom wall, comprising a second lip,
  wherein one of the plurality of ferrules resides within the bottom, first side, and second side walls,
  wherein the first and second lips engage the ferrule, wherein the first and second lips assist in preventing the one of the plurality of ferrules from being removed from the body,
a spring coupled to the body and the one of the plurality of ferrules, and
a sleeve coupled to the body, comprising a locking feature for locking the body to an optical device.

39. A method for providing a connector for an optical device, comprising the sequential steps of:
(a) providing a polished ferrule;
(b) placing a spring onto the polished ferrule;
(c) placing the polished ferrule and the spring within a body comprising a bottom wall, a first side wall coupled to the bottom wall, and a second side wall coupled to the bottom wall,
  wherein the first side wall comprises a first lip, wherein the second side wall comprises a second lip, wherein the first and second lips engage the polished ferrule, wherein the first and, second lips assist in preventing the ferrule from being removed from the body; and
(d) placing the polished ferrule, the spring, and the body through a sleeve, wherein the sleeve comprises a locking feature to lock the body to the optical device.

40. A connector housing for a connector to an optical device, comprising:
a body, comprising:
  a bottom wall,
  a first side wall coupled to the bottom wall, comprising a first lip,
  a second side wall coupled to the bottom wall, comprising a second lip,
  wherein the bottom wall, first side wall, and second side wall are configured to receive a ferrule,
  wherein the first and second lips are configured to engage the ferrule, wherein the first and second lips are configured to assist in preventing the ferrule from being removed from the body;
a spring coupled to the body and configured to be coupled to the ferrule; and
a sleeve coupled to the body, comprising a locking feature for locking the body to the optical device.

41. The converter of claim 1, wherein the ferrule comprises a plurality of optical fibers.

* * * * *